(12) United States Patent
Boireau et al.

(10) Patent No.: US 7,873,385 B2
(45) Date of Patent: Jan. 18, 2011

(54) ANTENNA SHARING TECHNIQUES

(75) Inventors: Olivier Boireau, Los Altos, CA (US);
Karl Townsend, Los Altos, CA (US);
Avi Kopleman, Sunnyvale, CA (US);
Suresh Krishnan, Sunnyvale, CA (US);
Parag Gupta, San Jose, CA (US);
Jerome C. Tu, Saratoga, CA (US);
Alexander Fertelmeister, Cupertino, CA (US); Robert Brown, Pleasant Hill, CA (US)

(73) Assignee: Palm, Inc., Sunnyvale, CA (US)

( * ) Notice: Subject to any disclaimer, the term of this patent is extended or adjusted under 35 U.S.C. 154(b) by 481 days.

(21) Appl. No.: 11/399,004

(22) Filed: Apr. 5, 2006

(65) Prior Publication Data
US 2007/0238483 A1 Oct. 11, 2007

(51) Int. Cl.
*H04M 1/00* (2006.01)

(52) U.S. Cl. ............... 455/553.1; 455/552.1; 455/90.2; 455/422.1; 455/73; 455/41.2; 455/41.1; 455/63.1; 455/63.3; 455/67.11; 455/67.13; 370/328; 370/338; 370/401; 370/341; 370/347; 370/441; 370/442; 370/464; 370/335; 370/342; 370/344; 370/296; 370/465; 375/133; 375/141

(58) Field of Classification Search .............. 455/41.2, 455/41.1, 63.1, 63.3, 67.11, 67.13, 114.2, 455/552.1, 90.2, 422.1, 73, 422; 370/328, 370/338, 401, 341, 347, 441, 442, 464, 335, 370/342, 344, 296, 465; 375/133, 141
See application file for complete search history.

(56) References Cited

U.S. PATENT DOCUMENTS

| | | | |
|---|---|---|---|
| 5,499,243 A | 3/1996 | Hall | |
| 6,018,644 A | 1/2000 | Minarik | |
| 6,081,720 A | 6/2000 | Sampson | |
| 6,560,443 B1 * | 5/2003 | Vaisanen et al. | 455/73 |
| 6,584,090 B1 | 6/2003 | Abdelgany et al. | |
| 6,643,522 B1 * | 11/2003 | Young | 455/552.1 |
| 6,704,346 B1 * | 3/2004 | Mansfield | 375/136 |
| 6,842,607 B2 * | 1/2005 | Godfrey et al. | 455/41.2 |
| 7,046,649 B2 * | 5/2006 | Awater et al. | 370/338 |

(Continued)

FOREIGN PATENT DOCUMENTS

WO 2007118126 A2 10/2007

(Continued)

OTHER PUBLICATIONS 802.15.2 (TM), Part 15.2 Coexistence of Wireless Personal Area Networks with Other Wireless Devices Operating in Unlicensed Frequncy Bands, IEEE Computer Society, New York, Aug. 28, 2003, 126 pages.

*Primary Examiner*—Matthew D Anderson
*Assistant Examiner*—April G Gonzales
(74) *Attorney, Agent, or Firm*—Kacvinsky Daisak PLLC

(57) ABSTRACT

Antenna sharing techniques are described. A mobile computing device may comprise an antenna, a switch to couple to the antenna, and multiple transceivers to couple to the switch. The mobile computing device may also comprise an antenna management module to couple to the switch and the transceivers. The antenna management module may control the switch to electrically connect one of the transceivers to the antenna. Other embodiments may be described and claimed.

17 Claims, 14 Drawing Sheets

U.S. PATENT DOCUMENTS

| | | |
|---|---|---|
| 7,177,645 B2 | 2/2007 | Goldhamer |
| 7,233,602 B2 | 6/2007 | Chen et al. |
| 7,251,459 B2 | 7/2007 | McFarland et al. |
| 7,324,793 B2 * | 1/2008 | Lee et al. .................... 455/130 |
| 7,447,519 B2 | 11/2008 | Axness et al. |
| 7,489,903 B2 | 2/2009 | Johansson et al. |
| 7,580,386 B2 | 8/2009 | Oliver |
| 7,710,927 B2 * | 5/2010 | Ozluturk ..................... 370/335 |
| 2001/0005685 A1 | 6/2001 | Nishimori et al. |
| 2002/0068588 A1 | 6/2002 | Yoshida et al. |
| 2002/0090974 A1 | 7/2002 | Hagn |
| 2005/0170776 A1 | 8/2005 | Siorpaes et al. |
| 2006/0104232 A1 | 5/2006 | Gidwani |
| 2006/0121916 A1 | 6/2006 | Aborn et al. |
| 2006/0153284 A1 | 7/2006 | Souissi et al. |
| 2007/0115905 A1 | 5/2007 | Jokela et al. |
| 2007/0129104 A1 * | 6/2007 | Sano et al. ............... 455/553.1 |
| 2007/0149123 A1 | 6/2007 | Palin |
| 2007/0238483 A1 | 10/2007 | Boireau et al. |
| 2007/0293224 A1 | 12/2007 | Wang et al. |
| 2008/0102885 A1 | 5/2008 | Tu et al. |
| 2008/0260000 A1 | 10/2008 | Periyalwar et al. |

FOREIGN PATENT DOCUMENTS

| | | |
|---|---|---|
| WO | 2008055227 A2 | 5/2008 |
| WO | 2008055227 A3 | 5/2008 |

* cited by examiner

| GSM / UMTS band | Typical GSM / UMTS Sensitivity | SNR Req. | Noise Floor | Margin | Required System Noise | Antenna Coupling | Allowed WLAN noise @Antenna | Actual PA noise @16 dbm | Filter Min. Req. |
|---|---|---|---|---|---|---|---|---|---|
| | Dbm (200 KHz, 5 MHz) | db | dbm/Hz | db | dbm/Hz | db | dbm/Hz | dbm/Hz | db |
| 850.0 | -106.5 | 7.0 | -166.5 | 5.0 | -171.5 | -10.0 | -161.5 | -147.0 | 14.5 |
| 900.0 | -106.5 | 7.0 | -166.5 | 5.0 | -171.5 | -10.0 | -161.5 | -146.0 | 15.5 |
| DCS | -106.5 | 7.0 | -166.5 | 5.0 | -171.5 | -10.0 | -161.5 | -137.0 | 24.5 |
| PCS | -106.5 | 7.0 | -166.5 | 5.0 | -171.5 | -10.0 | -161.5 | -133.0 | 28.5 |
| UMTS | -119.0 | -18.0 | -168.0 | 5.0 | -173.0 | -10.0 | -163.0 | -117.0 | 46.0 |

ANTENNA SHARING TECHNIQUES

BACKGROUND

A mobile computing device such as a smart phone may have voice and data communications capabilities as well as processing capabilities. In some cases, a mobile computing device may use multiple communications transceivers. For example, a mobile computing device might use different transceivers for voice and data communications. Each transceiver may need one or more antennas. Each antenna may potentially increase device power requirements, create interference between antennas, increase complexity and cost, and affect a size and shape for a mobile computing device. Consequently there may be a need for improvements to solve these and other problems.

BRIEF DESCRIPTION OF THE DRAWINGS

FIG. 4 illustrates one embodiment of a filter table.

DETAILED DESCRIPTION

Various embodiments may be generally directed to antenna sharing techniques for a wireless device, such as a mobile computing device. A mobile computing device may include multiple transceivers. In an effort to reduce a number of antennas needed for the multiple transceivers, a mobile computing device may use a shared antenna architecture where the transceivers share a single antenna or antenna array. In one embodiment, for example, a mobile computing device may include an antenna, a switch, and multiple transceivers. An antenna management module may control the switch to electrically connect one of the transceivers to the antenna in order for a given transceiver to transmit or receive information over the antenna. Antenna sharing techniques may provide several advantages for a mobile computing device, such as decreasing or reducing device power requirements, interference between antennas, device size, device shape, device complexity, device component count, and so forth. Antenna sharing techniques may also provide several new use scenarios, as described in more detail below. As a result, a user may realize enhanced products or services.

Various embodiments may comprise one or more elements. An element may comprise any structure arranged to perform certain operations. Each element may be implemented as hardware, software, or any combination thereof, as desired for a given set of design throughput or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
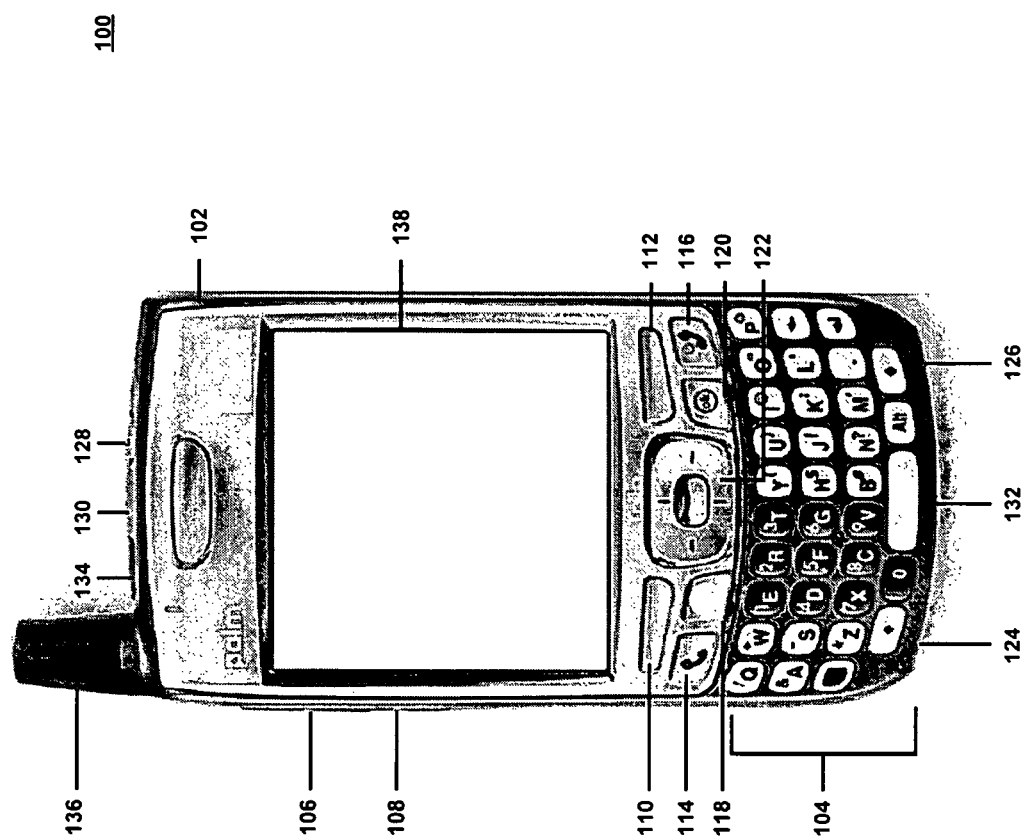
FIG. 1 illustrates one embodiment of a first wireless device.

FIG. 1 illustrates one embodiment of a wireless device 100. Wireless device 100 may comprise any device having a wireless transceiver arranged to communicate over one or more portions of a radio-frequency (RF) spectrum. In one embodiment, for example, wireless device 100 may comprise a mobile computing device. A mobile computing device may include any computing device with a self-contained power source, such as a battery, for example. Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. The embodiments are not limited in this context.

As shown in FIG. 1, mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with mobile computing device 100 implemented as a smart phone by way of example, it may be appreciated that the embodiments are not limited in this context.

Mobile computing device 100 may comprise a housing 102. Housing 102 may include one or more materials such as plastic, metal, ceramic, glass, carbon fiber, various polymers, and so forth, suitable for enclosing and protecting the internal components of mobile computing device 100. Housing 102 may be used to encapsulate various internal components for mobile computing device 100, such as a processor, a memory, one or more transceivers, one or more printed circuit board (PCB), one or more antennas, a stylus, and so forth. In one embodiment, housing 102 may have a shape, size and/or form factor capable of being held with an average human hand, such as a handheld computer, cellular telephone, PDA, combination PDA/cellular telephone, smart phone, and so forth.

Mobile computing device 100 may comprise various input/output (I/O) devices, such as an alphanumeric keyboard, alphanumeric keypad, numeric keys, keys, buttons, switches, rocker switches, multi-directional rocker switches, a microphone, an audio headset, a camera, a touch-sensitive display screen, a stylus, and so forth. As shown in FIG. 1, for example, mobile computing device 100 may comprise an alphanumeric keyboard 104 having a QWERTY key layout and an integrated number dial pad. Mobile computing device 100 may comprise various buttons such as, for example, a volume button 106, a customizable button 108, a left action button 110, a right action button 112, a phone/send button 114, a power/end button 116, a start button 118, an OK button 120, and a navigation button 122. Mobile computing device 100 may comprise an audio port 124 to connect an audio headset, a microphone 126, a ringer on/off switch 128 having a vibrate mode, and an expansion slot 130 to support a multimedia and/or memory card, for example.

Mobile computing device 100 may comprise a serial connection port 132, an infrared port 134, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system. Mobile computing device 100 also may comprise a rechargeable battery, such as a removable and rechargeable lithium ion battery, and an alternating current (AC) adapter.

Mobile computing device 100 may comprise a display 138. Display 138 may comprise any suitable display unit for displaying information appropriate for a mobile computing device. In addition, display 138 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 138.

In one embodiment, for example, display 138 may be implemented by a liquid crystal display (LCD) or other type of suitable visual interface. Display 138 may comprise, for example, a touch-sensitive color (e.g., 16-bit color) display screen. In various implementations, the display 138 may comprise one or more thin-film transistors (TFT) LCD including embedded transistors. In such implementations, the display 138 may comprise a transistor for each pixel to implement an active matrix. While the embodiments are not limited in this context, an active matrix display is desirable since it requires lower current to trigger pixel illumination and is more responsive to change than a passive matrix.

Mobile computing device 100 may comprise an antenna system including one or more antennas. The antennas may be internal antennas, external antennas, or a combination of both. In one embodiment, for example, the antenna system may include an external antenna 136 implemented as a stub antenna, a whip antenna, an extendable antenna, and so forth. The antenna system may also include one or more internal antennas, such as a planar inverted-F antenna, a planar inverted-L antenna, an inverted-F antenna with a helical structure, an inverted-L antenna with a helical structure, a monopole antenna, a meandered monopole antenna, a dipole antenna, a balanced antenna, a printed helical antenna, a chip antenna, a ceramic antenna, and so forth. The embodiments are not limited in this context.

Mobile computing device 100 may use multiple transceivers coupled to the antenna system. Mobile computing device 100 may include multiple transceivers, with each transceiver arranged to communicate using different types of protocols, communication ranges, operating power requirements, radio-frequency (RF) sub-bands, information types (e.g., voice or data), use scenarios, applications, and so forth. In one embodiment, for example, mobile computing device 100 may include at least three types of transceivers, including a cellular radiotelephone system transceiver for voice communications, a wireless networking transceiver for longer range data communications (and possibly voice communications), and a personal area network transceiver for shorter range data communications. In some cases, for example, the multiple transceivers may have overlapping transmit and/or receive bands.

In various embodiments, mobile computing device 100 may be implemented with a shared antenna architecture. In an effort to reduce an overall number of antennas used by mobile computing device 100, each transceiver of mobile computing device 100 may be coupled to a shared antenna system, with the antenna system comprising a single antenna or antenna array with multiple antennas. An antenna management module may be arranged to perform, manage or control antenna sharing operations, and may be implemented in software, hardware, or a combination of both. For example, the antenna management module may be coupled to an antenna switch, and control the antenna switch to accurately time antenna connections with the appropriate transceiver. By sharing an antenna among multiple transceivers, mobile computing device 100 may realize reduced device power requirements, interference between antennas, device size, device shape, device complexity, device components, and so forth. The shared antenna architecture and corresponding antenna sharing techniques implemented for mobile computing device 100 may be described in more detail with reference to FIGS. 2-5.

Figure 2:
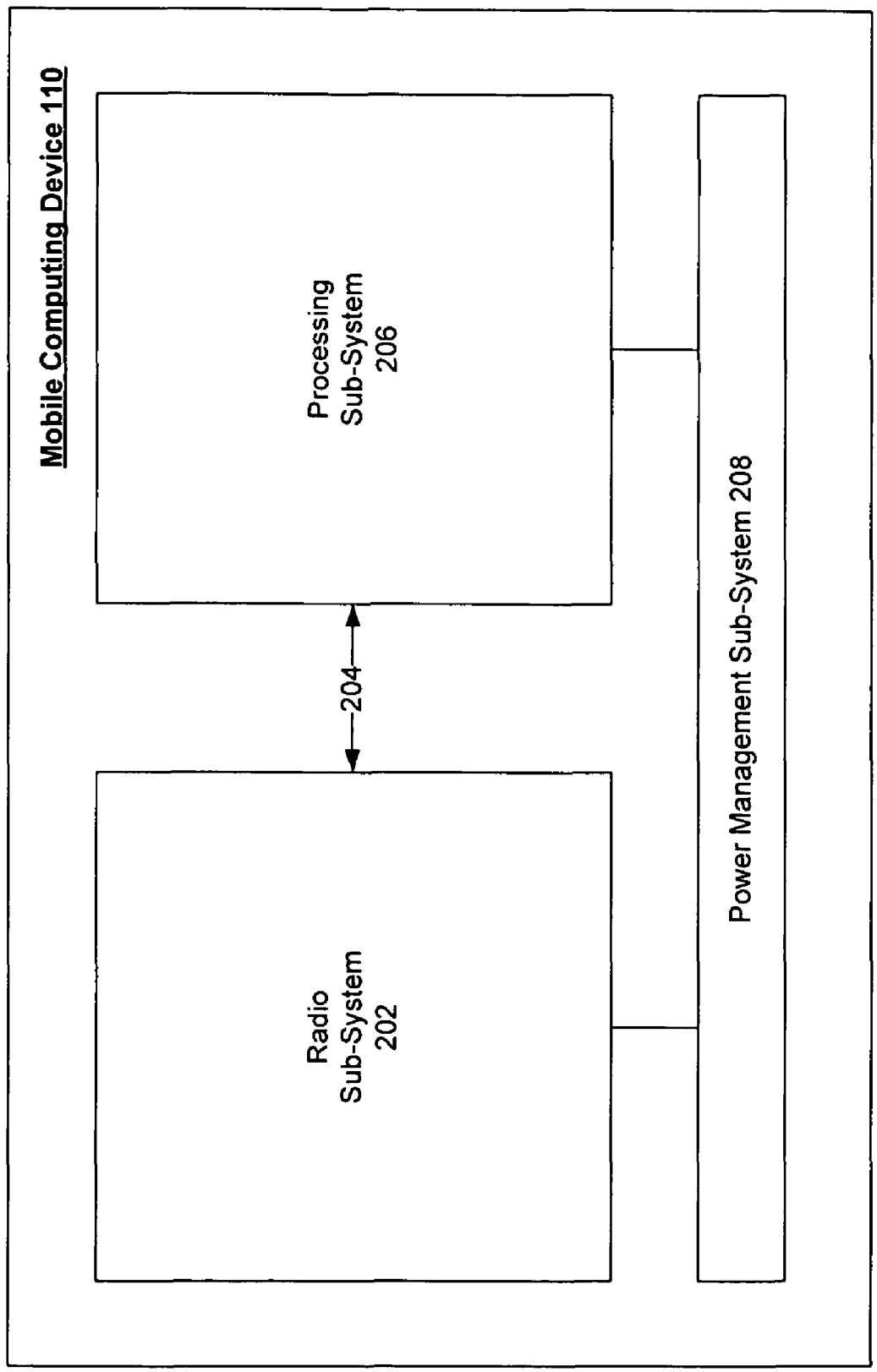
FIG. 2 illustrates one embodiment of a second wireless device.

FIG. 2 illustrates a more detailed block diagram of mobile computing device 100 as described with reference to FIG. 1. As shown in FIG. 2, mobile computing device 100 may include a radio sub-system 202 connected via bus 204 to a processing sub-system 206. Radio sub-system 202 may perform voice and/or data communications operations on behalf of mobile computing device 100. Processing sub-system 206 may provide processing or computing resources to mobile computing device 100. The processing resources may be used to execute various types of software for mobile computing device 100, such as application software or system software (e.g., an operating system). Radio sub-system 202 and processing sub-system 206 may communicate and synchronize operations using bus 204. Bus 204 may comprise a USB or micro-USB bus and appropriate interfaces, as well as others.

In various embodiments, mobile computing device 100 may further include a power management sub-system 208. Power management sub-system 208 may manage power for mobile computing device 100, including radio sub-system 202, processing sub-system 206, and other elements of mobile computing device 100. For example, power management sub-system 208 may include one or more batteries to provide direct current (DC) power, and one or more AC interfaces to draw power from an AC power source, such as a standard AC main power supply. The embodiments are not limited in this context.

Figure 3:
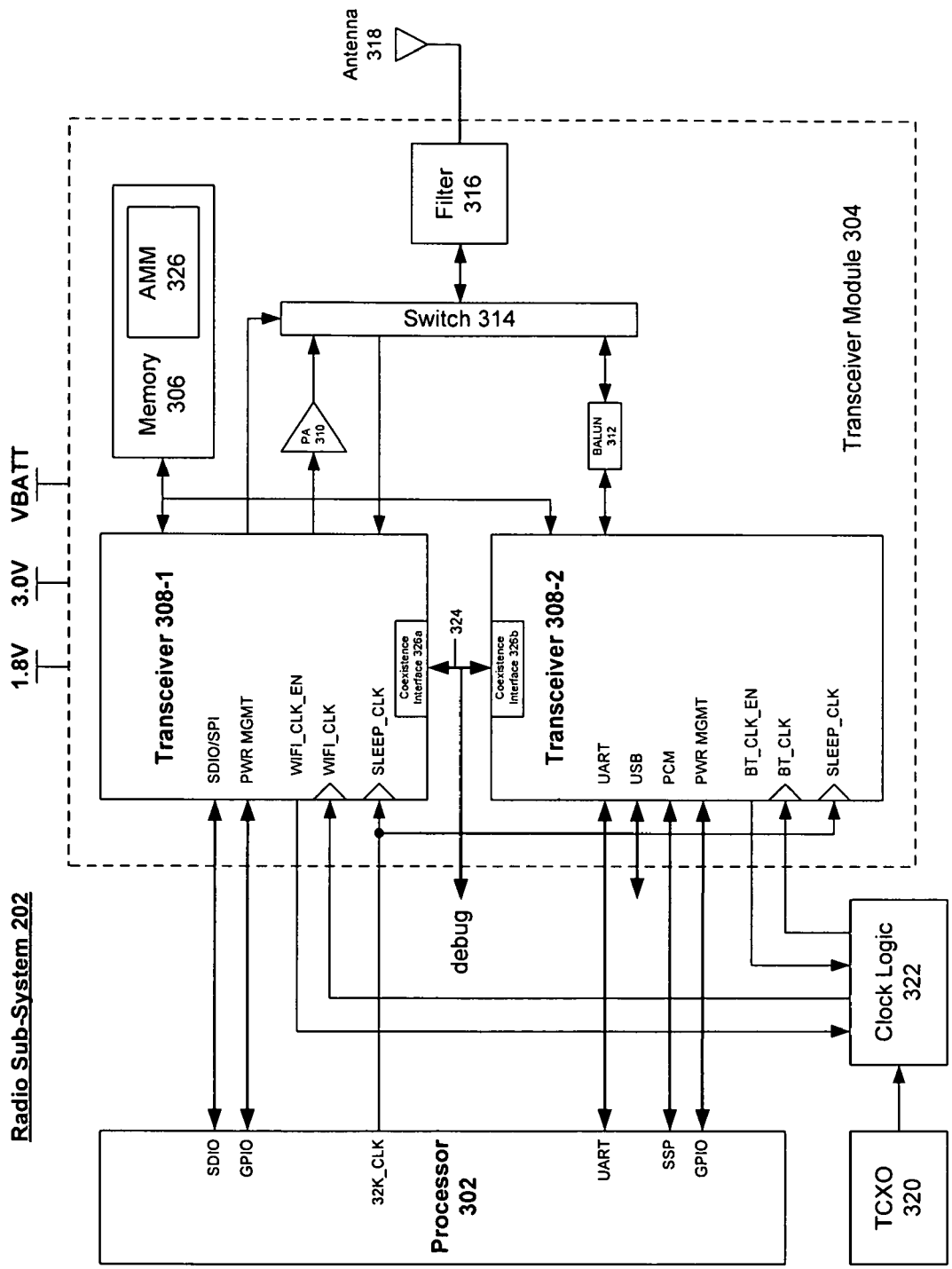
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and/or data communication operations for mobile computing device 100. For example, radio sub-system 202 may be arranged to communicate voice information and/or data information over one or more assigned frequency bands of a wireless shared media.

In various embodiments, radio sub-system 202 of mobile computing device 100 may be arranged to perform voice communications in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, various embodiments of radio sub-system 202 may be arranged to perform data communications in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments are not limited in this respect.

In various embodiments, radio sub-system 202 may be arranged to perform voice and/or data communications in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The embodiments are not limited in this respect.

In various embodiments, radio sub-system 202 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices. The embodiments are not limited in this respect.

In various embodiments, radio sub-system 202 may implement a shared antenna architecture for multiple transceivers used to implement voice and/or data communications as previously described. As shown in FIG. 3, radio sub-system 202 may include a transceiver module 304 connected to a processor 302, a temperature compensated oscillator (TCXO) 320, and clock logic 322. Transceiver module 304 may be connected to one or more antennas 318.

In various embodiments, transceiver module 304 may include multiple transceivers 308-1-n. Transceiver module 304 in general, and transceivers 308-1-n in particular, may be implemented using one or more hardware elements and/or software elements. In general, a hardware element may refer to any hardware structures arranged to perform certain operations. In one embodiment, for example, the hardware elements may include any analog or digital electrical or electronic elements fabricated on a substrate. The fabrication may be performed using Gallium Arsenide (GaAs) techniques, as well as silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In various embodiments, transceiver module 304 may include multiple transceivers and associated hardware and/or software components implemented in a single integrated package or module, such as on the same die, package or PCB. Transceiver module 304 may be implemented using a single chip, multiple chips, or a system on a chip (SoC) solution, as desired for a given set of performance and design constraints. In one embodiment, for example, transceiver module 304 may be implemented as multiple chips in a single package, with the package having dimensions of approximately 10×10 mm, 1.7 mm maximum height, including any appropriate shielding. The embodiments are not limited in this context.

In various embodiments, the various hardware and/or software elements of transceiver module 304 may be arranged in a shared antenna architecture to allow multiple transceivers 308-1-n to share use of antenna 318 using a switch 314 under the control of antenna management module 326. The shared antenna architecture may reduce or obviate the need for mobile computing device 100 to include an antenna or antenna array for each transceiver 308-1-n, and the corresponding cost and complexity associated with each additional antenna or antenna array.

In accordance with a shared antenna architecture, transceiver module 304 may include multiple radio transceivers 308-1-n, such as transceivers 308-1, 308-2 connected by signal lines 324. Transceivers 308-1, 308-2 may be connected to a memory 306. Memory 306 may include an antenna management module (AMM) 326. Transceiver 308-1 may also be connected to a power amplifier (PA) 310. Transceiver 308-2 may also be connected to a balanced-unbalanced (BALUN) converter 312. PA 310 and BALUN 312 may be connected to a switch 314. Switch 314 may be connected to a filter 316. Filter 316 may be connected to an antenna 318.

In various embodiments, transceivers 308-1, 308-2 may be arranged to perform data communications in accordance with a different set of wireless communications protocols and techniques. Although transceiver module 304 is shown with two transceivers 308-1, 308-2 by way of example, transceiver module 304 may be implemented using more transceivers as desired for a given implementation. For example, radio sub-system 202 and/or transceiver module 304 may include a third transceiver primarily directed to voice communications, such as a cellular radiotelephone system transceiver (e.g., GSM transceiver, UMTS transceiver, CDMA transceiver, and so forth). The embodiments are not limited in this respect.

In one embodiment, transceiver 308-1 may comprise an 802.11x transceiver. For example, transceiver 308-1 may support IEEE 802.11b/g operations, IEEE 802.11e quality of service (QoS) operations, IEEE 802.11i security operations, voice over WLAN (VoWLAN) operations for single-mode and dual-mode phones, coexistence with cellular radiotelephone transceivers and Bluetooth transceivers (e.g. 2-wire or 3-wire), and Cisco Compatible Extensions Version 4.0 (CCXv4) support operations. In one embodiment, transceiver 308-1 may be implemented as an 802.11x transceiver using, for example, a chipset made by Marvell Technology Group Ltd. Transceiver 308-1 may have certain WiFi RF performance constraints and design throughput, such as a transmit power of +16 dBm typical for 802.11b (CCK) and +13 dBm typical for 802.11g (QAM/OFDM), and receiver sensitivity of −65 dBm at 54 Mbps OFDM and a 10% packet error rate (PER), −82 dBm at 6 Mbps OFDM and 10% PER, −76 dBm at 11 Mbps CCK and 8% frame error rate (FER), and −80 dBm at 2 Mbps DSSS and 8% FER. These performance constraints and design throughput are provided by way of example only, and the embodiments are not limited in this context.

In one embodiment, transceiver 308-2 may comprise a Bluetooth transceiver. For example, transceiver 308-2 may be implemented using a chipset made by CSR plc, for example. In one embodiment, for example, transceiver 308-2 may support Cambridge Silicon Radio (CSR) BlueCore™ 5 operations, Bluetooth stack v1.2+EDR operations, Synchronous Connection Oriented (SCO) and/or Extended SCO (eSCO) support operations, multiple Asynchronous Connection-Less (ACL) connection operations, Advanced Audio Distribution Profile (A2DP) operations, voice dialing operations, or coexistence with WiFi (e.g., 3-wire). The embodiments are not limited in this context.

In one embodiment, transceiver 308-1 may be connected to memory 306. Memory 306 may be implemented using any machine-readable or computer-readable media capable of storing data, including both volatile and non-volatile memory. For example, memory 306 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In one embodiment, for example, memory 306 may comprise an electrically erasable programmable read-only memory (EEPROM). The embodiments are not limited in this context.

In various embodiments, memory 306 implemented as an EEPROM may be used to store WiFi calibration data for transceiver 308-1, the WiFi MAC address for transceiver 308-1, and the Bluetooth MAC address for transceiver 308-2. It may be desirable to store optional Bluetooth calibration data in the unused portion of the serial EEPROM. The EEPROM may be accessible (e.g., read and write) by the host system, such as by processor 302 or processing sub-system 206, for example.

In various embodiments, memory 306 may store one or more software components. A software component may refer to one or more programs, or a portion of a program, used to implement a discrete set of operations. In one embodiment, for example, memory 306 may include one or more software components, such as antenna management module (AMM) 326. In one embodiment, for example, AMM 326 may be implemented as low level firmware running inside the 802.11 chip of transceiver 308-1. In this arrangement, the upper layer software running on the host processor (e.g., processor 302) may not necessarily control the RF switch, or otherwise be aware of antenna sharing. AMM 326 may be executed by a processor, such as processor 302 or a processor implemented as part of transceiver 308-1 (e.g., a DSP). It is worthy to note that although some embodiments may describe these modules as software components executed by a processor, it may be appreciated that some or all of the operations of the software components may be implemented using other processors accessible by mobile computing device 100, such as processor 506 of processing sub-system 206 as described with reference to FIG. 5, for example. Furthermore, these modules may also be implemented using dedicated hardware circuits or structures, or a combination of dedicated hardware and software, as desired for a given implementation. The embodiments are not limited in this context.

In operation, AMM 326 may be responsible for certain antenna sharing operations of transceiver module 304. For example, AMM 326 may be arranged to control transmitting/receiving operations and associated timing for transceivers 308-1, 308-2. In another example, AMM 326 may also be arranged to control switch 314 to alternate electrically connecting transceivers 308-1, 308-2 to antenna 318. In yet another example, AMM 326 may further be arranged to control various filter throughput for filter 316. These are merely some examples of the antenna sharing operations for AMM 326, and the embodiments are not limited in this context.

In one embodiment, transceivers 308-1, 308-2 may be connected to switch 314 via a PA 310 and BALUN 312, respectively. PA 310 may be used to amplify any signals to be transmitted over a wireless shared media. For example, PA 310 may provide transmit power of +16 dBm needed for 802.11b (CCK). PA 310 may be arranged to work in all frequency bands assigned to transceiver 308-1. PA 310 may also operate in various modulation modes suitable for transceiver 308-1. BALUN 312 may comprise a device designed to convert between balanced and unbalanced electrical signals. Switch 314 may electrically connect transceivers 308-1, 308-2 to antenna 318 in response to control signals from AMM 326.

In various embodiments, antenna 318 may be connected to switch 314. Antenna 318 may be used for transmitting and/or receiving electrical signals via wireless shared media such as one or more bands or sub-bands of RF spectrum. In operation, antenna 318 may be used to communicate information over a wireless shared media. During transmission, antenna 318 may accept energy from a transmission line and radiate this energy into space via a wireless shared media. During reception, antenna 318 may gather energy from an incident wave received over the wireless shared media, and provide this energy to a corresponding transmission line. The amount of power radiated from or received by antennas 318 is typically described in terms of gain.

In various embodiments, antenna 318 may be implemented as one or more internal antennas, external antennas, or a combination of both, as described with reference to FIG. 1. In one embodiment, for example, antenna 318 may be implemented alone, or as part of a broader antenna system (e.g., antenna 136) or antenna array for mobile computing device 100. Antenna 318 may be shared between and among transceivers 308-1-n of transceiver module 304. Although FIG. 3 illustrates a single antenna 318 for purposes of clarity, it may be appreciated that radio sub-system 202 may use multiple antennas in the form an antenna array. Multiple antennas may be desirable when implementing spatial diversity techniques (e.g., beamforming) and/or high-throughput Multiple-Input-Multiple-Output (MIMO) systems (e.g., 802.11n and 802.16e systems). In this case, the entire antenna array may be shared between and among transceivers 308-1-n of transceiver module 304.

In various embodiments, radio sub-system 202 may include processor 302. Processor 302 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 302 may be implemented as a general purpose processor or a dedicated processor. Examples of a dedicated processor may include a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In various embodiments, processor 302 may perform baseband operations for radio sub-system 202. Baseband processor 302 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, Gaussian Minimum Shift Keying (GSMK) modulators, GPRS ciphers, transceiver controls, automatic frequency control (AFC), automatic gain control (AGC), power amplifier (PA) ramp control, and other circuits. Baseband processor 302 may further include various interfaces for communicating with a host processor of processing sub-system 206. For example, baseband processor 302 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

It may be appreciated that the operations of baseband processor 302 may be integrated with or performed by other processors of mobile computing device 100, such as an application processor implemented for processing sub-system 206 as described in more detail with reference to FIG. 5. Furthermore, although processor 302 is shown separate from transceiver module 304, it may be appreciated that some embodiments may implement processor 302 as part of transceiver module 304 and/or transceivers 308-1-n as well. The embodiments are not limited in this context.

Processor 302 and transceiver module 304 may communicate using various interface signals. Furthermore, transceiver module 304 may have certain operating power requirements. Examples of the various interface signals and operating power suitable for a shared antenna architecture of transceiver 304 may be given in Tables 1-7 as provided below. The embodiments, however, are not limited to these particular examples.

In one embodiment, for example, processor 302 and transceiver 308-1 of transceiver module 304 may communicate using the WiFi interface signals shown in Table 1 as follows:

TABLE 1

| Name | I/O | Description |
| --- | --- | --- |
| SDIO_CLK | Input | SDIO Clock and SPI_CLK |
| SDIO_CMD | Bidirectional | SDIO Command and SPI_SDI |
| SDIO_D0 | Bidirectional | SDIO Data Bus 0 and SPI_CSn |
| SDIO_D1 | Bidirectional | SDIO Data Bus 1 and SPI_SDO |
| SDIO_D2 | Bidirectional | SDIO Data Bus 2 and SPI_INTn |
| SDIO_D3 | Bidirectional | SDIO Data Bus 3 |

In one embodiment, for example, processor 302 and transceiver 308-2 of transceiver module 304 may communicate using the Bluetooth interface signals shown in Table 2 as follows:

TABLE 2

| Name | I/O | Description |
| --- | --- | --- |
| UART_TXD | Output | UART Transmit Data |
| UART_RXD | Input | UART Receive Data |
| UART_RTS | Output | UART Request To Send |
| UART_CTS | Input | UART Clear To Send |
| USB_DP | Bidirectional | USB D+ |
| USB_DM | Bidirectional | USB D− |
| PCM_CLK | Output | PCM Clock |
| PCM_SYNC | Output | PCM Sync |
| PCM_DIN | Input | PCM Data In |
| PCM_DOUT | Output | PCM Data Out |

In one embodiment, for example, processor 302 and transceiver 308-1 of transceiver module 304 may communicate using the WiFi debug interface signals shown in Table 3 as follows:

TABLE 3

| Name | I/O | Description |
| --- | --- | --- |
| JTAG_TCK | Input | JTAG Test Clock |
| JTAG_TDI | Input | JTAG Test Data Input |
| JTAG_TDO | Output | JTAG Test Data Output |
| JTAG_TRSTn | Input | JTAG Test Reset |
| JTAG_TMS_ARM | Input | JTAG Test Mode Select 2 |
| JTAG_TMS2 | Input | JTAG Test Mode Select 1 |

In one embodiment, for example, processor 302 and transceivers 308-1, 308-2 of transceiver module 304 may communicate using the coexistence debug interface signals shown in Table 4 as follows:

TABLE 4

| Name | I/O | Description |
| --- | --- | --- |
| WL_ACTIVEn | Output | WLAN Active, active low |
| Bluetooth_PRIORITY | Output | Bluetooth Priority |
| Bluetooth_STATE | Output | Bluetooth State |

In one embodiment, for example, processor 302 and transceivers 308-1, 308-2 of transceiver module 304 may communicate using the power management interface signals shown in Table 5 as follows:

TABLE 5

| Name | I/O | Description |
| --- | --- | --- |
| WIFI_RESET | Input | WiFi RESET |
| WIFI_PWR_DOWN | Input | WiFi power down signal |

TABLE 5-continued

| Name | I/O | Description |
| --- | --- | --- |
| Bluetooth_RESET | Input | Bluetooth RESET |
| Bluetooth_HOST_WAKE | Output | Bluetooth signal to wake up the Host |
| Bluetooth_WAKE | Input | Bluetooth wake up signal |

In one embodiment, for example, processor 302 and transceivers 308-1, 308-2 of transceiver module 304 may communicate using the clock interface signals shown in Table 6 as follows:

TABLE 6

| Name | I/O | Description |
| --- | --- | --- |
| SLEEP_CLK | Input | 32 KHz sleep clock |
| WIFI_CLK_EN | Output | WiFi Clock Enable |
| WIFI_CLK | Input | WiFi Clock |
| Bluetooth_CLK_EN | Output | Bluetooth Clock Enable |
| Bluetooth_CLK | Input | Bluetooth Clock |

In one embodiment, for example, transceiver module 304 may have power requirements as shown in Table 7 as follows:

TABLE 7

| Name | I/O | Description |
| --- | --- | --- |
| VDD_1.8 | Power | 1.8 V Supply |
| VDD_3.0 | Power | 3.0 V Supply |
| VBATT | Power | Battery Voltage, range: 3.2–4.2 V typical, 5.0 V max |
| GND | Power | Ground |

As shown in Table 7, the host system can provide 1.8V and 3.0V supply voltages. The battery voltage, VBATT (3.2-4.2V) can be provided, if necessary. Transceiver module 304 may interface with processor 302 and clock logic 322 with a 1.8V I/O voltage. All I/O should be 1.8V, except the two USB signals, which will have an I/O voltage of 3.0V.

In various embodiments, transceivers 308-1, 308-2 may utilize a multiple transceiver coexistence protocol to allow transceivers 308-1, 308-2 to coexist and operate on transceiver module 304. In one embodiment, for example, the multiple transceiver coexistence protocol may comprise a multiple wire (e.g., 2-wire, 3-wire, or 4-wire) multiple transceiver coexistence protocol specifically designed to handle Bluetooth/WiFi coexistence. Transceivers 308-1, 308-2 may include coexistence interfaces 326a, 326b, respectively, as shown in FIG. 3. Since coexistence operations are implemented by transceivers 308-1, 308-2, host software support is not necessarily needed to actively support coexistence between transceivers 308-1, 308-2.

In various embodiments, radio sub-system 202 may include various other transceivers and accompanying antennas, such as one or more cellular radiotelephone system transceivers (e.g., GSM, UMTS, or CDMA transceivers), a GPS transceiver, and so forth. In this case, transceiver module 304 may need to coexist with the other transceivers, particularly with respect to cellular transceivers. Examples of specifications that may be implemented for cellular coexistence may be shown in Tables 8-10 as follows:

TABLE 8

| | | Max Noise (dBm/Hz) | | | |
| --- | --- | --- | --- | --- | --- |
| | Freq (MHz) | w/ BPF* | at PA Output** | At 8686 Output | |
| Maximum TX Wideband Noise | 869–894 | −164 | −119 | −119 | Continuous Mode Tx at 54 Mbps Pout = 15 dBm*** |
| | 925–960 | −164 | −119 | −119 | |
| | 1565–1585 | −164 | −124 | −124 | |
| | 1805–1880 | −164 | −124 | −129 | |
| | 1920–1990 | −164 | −124 | −134 | |
| | 2110–2170 | −164 | −124 | −144 | |

TABLE 9

| | | Max Spur (dBm) | | | |
| --- | --- | --- | --- | --- | --- |
| | Freq (MHz) | w/ BPF* | at PA Output** | At 8686 Output | |
| TX Spurious Tones | 869–894 | −111 | −66 | −66 | Continuous Mode Tx at 54 Mbps Pout = 15 dBm*** |
| | 925–960 | −111 | −66 | −66 | |
| | 1565–1585 | −111 | −71 | −71 | |
| | 1805–1880 | −111 | −71 | −76 | |
| | 1920–1990 | −111 | −71 | −81 | |
| | 2110–2170 | −103 | −63 | −83 | |

TABLE 10

| | | Minimum Jamming Power (dBm) | | |
| --- | --- | --- | --- | --- |
| | Freq (MHz) | w/ BPF* | at LNA Input | |
| Receiver Jamming Performance | 824–849 | 23 | −22 | Receiving 54 Mbps, desired signal is combined with single tone jamming signal |
| | 880–915 | 23 | −22 | |
| | 1710–1785 | 23 | −17 | |
| | 1850–1910 | 23 | −17 | |
| | 1920–1980 | 10 | −30 | |

The above specification for cellular coexistence as shown in Tables 8-10 assumes that antenna isolation is approximately 10 dB, final BPF and PA selection values may change corresponding values, and all measurements are made at the antenna port.

FIG. 4 illustrates one embodiment of a filter table. In various embodiments, filter 316 may be disposed between switch 314 and antenna 318. Filter 316 may be used to perform filtering operations for transceiver module 304, such as one or more channel filtering operations. Channel filtering operations may be needed to reduce or prevent interference between transceiver module 304 and other transceivers used by mobile computing device 100, such as a cellular radiotelephone system transceiver, for example. Transceiver and/or antenna interference may be caused in different ways. For example, the cellular transceiver may cause cell phone blocking (e.g., via harmonics or saturation) for transceivers 308-1, 308-2 of transceiver module 304. Similarly, one or both transceivers 308-1, 308-2 may overwhelm sensitivity for the cellular transceiver, such as WiFi signals from the 802.11x transceiver blocking signals intended for the cellular transceiver. Consequently, filter 316 may be used to filter signals such as WiFi and/or Bluetooth noise, spurious signals, and signals from the 802.11x or Bluetooth transceivers, as communicated between antenna 318 and transceivers 308-1, 308-2, to reduce or prevent interference with other antennas and/or transceivers.

In one embodiment, filter 316 may be implemented in accordance with the specifications as shown in filter table 400. Although filter table 400 indicates a set of filtering requirements to reduce or prevent cell phone blocking, additional filtering may be needed to attenuate cell phone transmit power at WiFi/Bluetooth antenna (e.g., antenna 318). For example, attenuation of approximately 45 db or greater may be needed at all cell phone transmitting bands. The particular filter values for filter 316 may vary in accordance with a given implementation, and the embodiments are not limited in this context.

Figure 5:
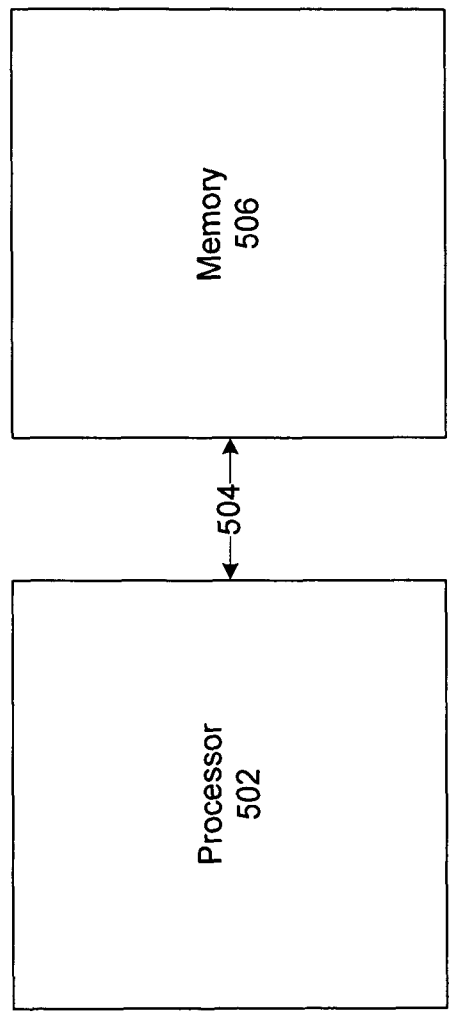
FIG. 5 illustrates one embodiment of a processing subsystem.

FIG. 5 illustrates one embodiment a processing sub-system. FIG. 5 illustrates a more detailed block diagram of processing sub-system 206 as described with reference to FIG. 2. As shown in FIG. 5, processing sub-system 206 may include a processor 502 connected to memory 506 via bus 504. Processor 502 may comprise any type of processor as described with reference to processor 302. Memory 506 may comprise any type of memory as described with reference to memory 306. It is worthy to note that some portion or all of memory 506 may be included on the same integrated circuit as processor 502 thereby obviating the need for bus 504. Alternatively some portion or all of memory 506 may be disposed on an integrated circuit or other medium, for example a hard disk drive, that is external to the integrated circuit of processor 502, and processor 502 may access memory 506 via memory bus 504.

Processing sub-system 206 may provide computing or processing operations for mobile computing device 100. For example, processing sub-system 206 may be arranged to execute various software programs for mobile computing device 100. Software programs may be generally grouped into application programs and system programs. Application programs allow a user to accomplish one or more specific tasks. Typical applications include office suites, business software, educational software, databases, communications software, computer games, and so forth. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, graphical user interfaces (GUI), and so forth.

In various embodiments, processing sub-system 206 of mobile computing device 100 may be capable of executing different OS. In computing, an OS is the system software responsible for the direct control and management of hardware and basic system operations. Additionally, it provides a foundation upon which to run application software such as word processing programs and web browsers. Mobile computing device 100 may utilize any OS suitable for smaller form factor devices, such as a Palm OS®, Microsoft Windows® CE, Microsoft Pocket PC, Microsoft Mobile, Symbian OS™, Embedix OS, and others. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
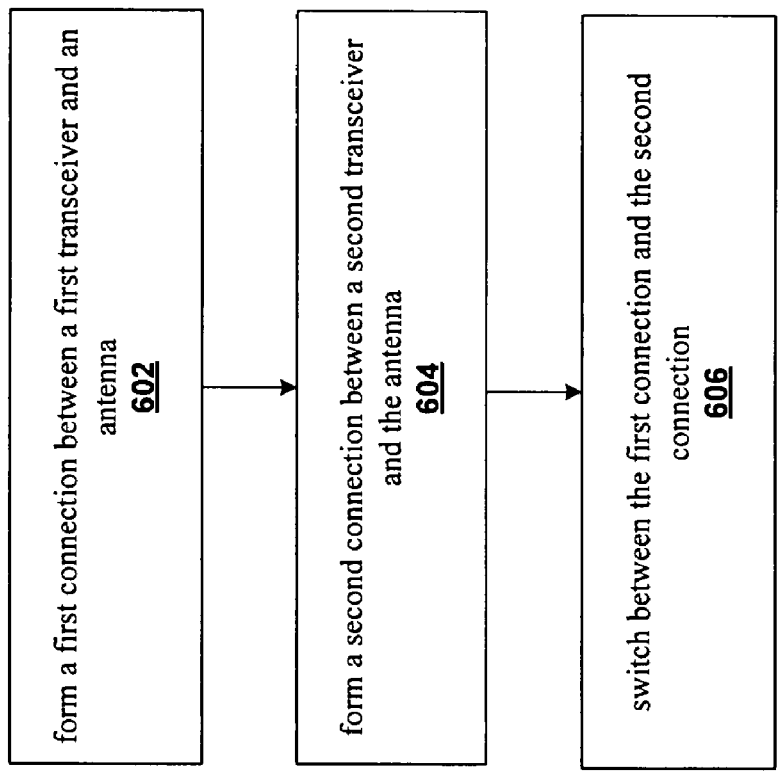
FIG. 6 illustrates one embodiment of a logic diagram.

FIG. 6 illustrates one embodiment of a logic flow. FIG. 6 illustrates a logic flow 600. Logic flow 600 may be representative of the operations executed by one or more embodiments described herein, such as AMM 326, transceiver 304, radio sub-system 202, and/or mobile computing device 100. As shown in logic flow 600, a first connection may be formed between a first transceiver and an antenna at block 602. A second connection may be formed between a second transceiver and the antenna at block 604. Switching between the first connection and the second connection may be performed at block 606. The embodiments are not limited in this context.

In one embodiment, a determination may be made as to whether the first transceiver is scheduled or ready to transmit or receive information. The scheduling may be based on priority levels assigned to the transceivers or a given set of traffic communicated by the transceivers. The determination may also be made by negotiation or arbitration between the transceivers. The second connection may be switched to the first connection in accordance with the determination. This may be accomplished, for example, using a coexistence status for the transceivers. The embodiments are not limited in this context.

In one embodiment, a determination may be made as to whether the second transceiver is scheduled or ready to transmit or receive information. The scheduling may be based on priority levels assigned to the transceivers or a given set of traffic communicated by the transceivers. The determination may also be made by negotiation or arbitration between the transceivers. The first connection may be switched to the second connection in accordance with the determination. This may be accomplished, for example, using a coexistence status for the transceivers. The embodiments are not limited in this context.

In one embodiment, channel filtering may be performed for the first connection and the second connection. The embodiments are not limited in this context.

In one embodiment, coexistence signals may be communicated between the first transceiver and the second transceiver. The embodiments are not limited in this context.

In various embodiments, for example, AMM 326 may be arranged to perform scheduling and/or timing operations for transceivers 308-1, 308-2 to share use of antenna 318. More particularly, AMM 326 may cause transceivers 308-1, 308-2 to switch between antenna 318 fast enough to enable substantially simultaneous operation of transceivers 308-1, 308-2 to enhance user experience. For example, transceiver 308-1 may maintain a WiFi connection to another device in order to perform certain WiFi operations (e.g., streaming media information from a network server), while at the same time transceiver 308-2 may maintain a Bluetooth connection to another device in order to perform certain Bluetooth operations (e.g., streaming the media information from mobile computing device 100 to a Bluetooth headset). AMM 326 may alternately switch between transceivers 308-1, 308-2 to form electrical connections between each respective transceiver and antenna 318 in a manner that allows both connections to remain active. AMM 326 may operate in conjunction with, or in control of, the coexistence protocol implemented for transceivers 308-1, 308-2, so that a user does not perceive intolerable delays when using either connection. In other words, AMM 326 may cause transceivers 308-1, 308-2 to operate in accordance with the same or similar Quality of Service (QoS)

requirements for both shared connections as for a single dedicated connection between a transceiver and antenna (e.g., 1-1 mapping). Coordination of reception and transmission operations for AMM 326 may be described in more detail with reference to FIGS. 7-14.

Figure 7:
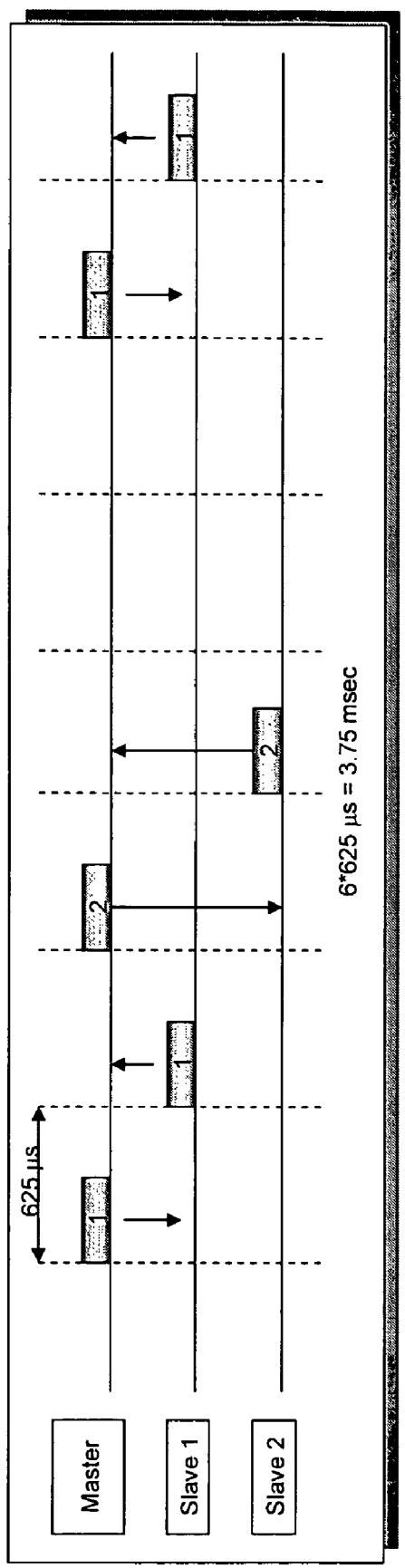
FIG. 7 illustrates one embodiment of a first radio interface.

FIG. 7 illustrates one embodiment of a first radio interface. More particularly, FIG. 7 illustrates a Bluetooth transceiver interface time-slot architecture. In general, a typical Bluetooth transceiver interface is derived primarily from a telephony perspective. There is a "master" and multiple "slaves." The master establishes a clear time-slot structure, and the slaves all synchronize to this time-slot structure. Transmission of information occurs on strictly defined time-slots, is predictable, has defined length, and can be controlled.

Figure 8:
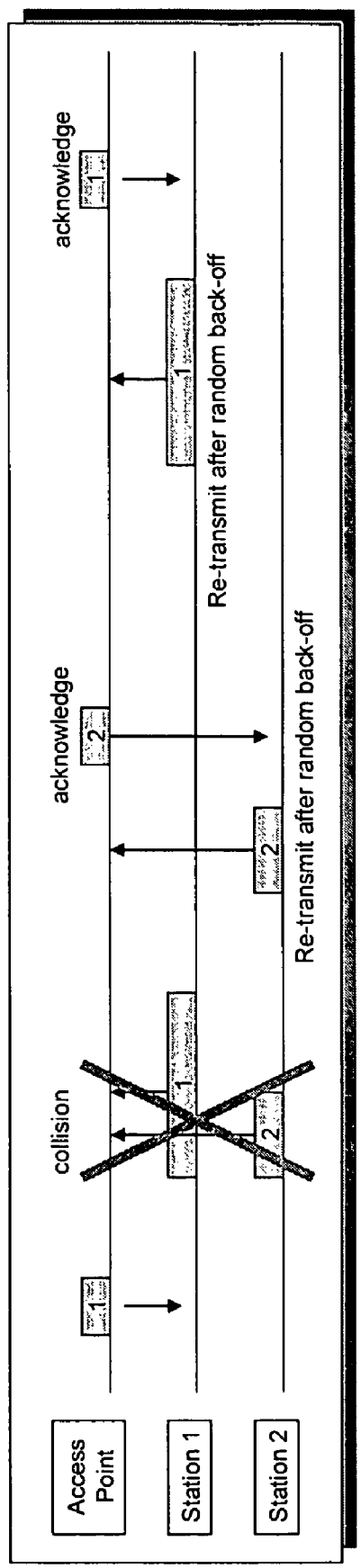
FIG. 8 illustrates one embodiment of a second radio interface.

FIG. 8 illustrates one embodiment of a second radio interface. More particularly, FIG. 8 illustrates one embodiment of a 802.11x transceiver interface time-slot architecture. By way of contrast to the Bluetooth transceiver interface, a typical 802.11x transceiver interface is derived from the Ethernet domain, where clients behave in a peer-to-peer fashion without strict time-slot architecture. Each device may transmit packets when it deems appropriate. The devices using "listen before transmit" policy and wait for acknowledgements from the recipient. The packet sizes are variable and difficult to predict.

As shown in FIGS. 7 and 8, Bluetooth and 802.11x transceiver access architectures are very different. Given that the two radio access mechanisms are different and not synchronized with each other, there exist many different ways in which transmissions and receptions from one radio can interfere with those of the other radio.

Figure 9:
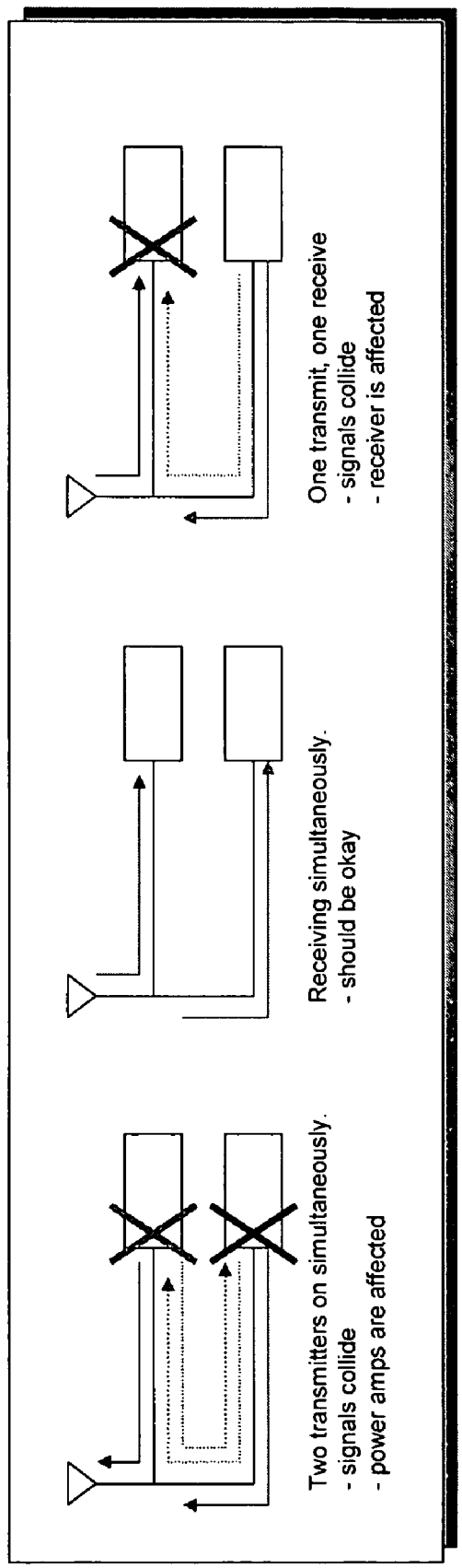
FIG. 9 illustrates different radio interference scenarios.

FIG. 9 illustrates different radio interference scenarios. As shown in scenario (a), if both transceivers 308-1, 308-2 transmit at the same time, the higher transmit powers will interfere with each other and may leak into the power amplifiers of each radio. As shown in scenario (b), if both transceivers 308-1, 308-2 receive at the same time, the received signals go into each radio separately and therefore should reduce potential interference, as the received signals tend to be lower power and radios receivers can handle the "mixed signal". This may be an acceptable scenario. As shown in scenario (c), if one radio transmits while the other radio receives, then the higher transmit power of one radio may interfere with the lower receive signal of the other radio. Furthermore, the higher transmit power may overload the front end of the low-noise amplifier of the receiver, thereby potentially causing some damage.

There are two general scenarios to consider when addressing timing issues to allow transceivers 308-1, 308-2 to share antenna 318. The first general scenario is when both transceivers 308-1, 308-2 need to transmit at the same time. The second general scenario is when one transceiver wants to transmit while the other is receiving.

In various embodiments, AMM 326 may implement one or more techniques to handle the case where both transceivers 308-1, 308-2 need to transmit at the same time. For example, AMM 326 may control the position of switch 314 to alternate use of antenna 318. Since only one of transceivers 308-1, 308-2 is electrically connected to antenna 318 at a given moment in time, transceivers 308-1, 308-2 may be prevented from interfering with each other. In another example, the Bluetooth transceiver may use Adaptive Frequency Hopping (AFH) of Bluetooth version 1.2. The AFH enabled Bluetooth transceiver may discover (or be informed by the 802.11x transceiver) which frequency channels are being used by the 802.11x transceiver. The Bluetooth master may then eliminate the affected Bluetooth channels from its hopping list and inform all of its slaves to avoid those channels. The Bluetooth piconet will then proactively avoid the frequency channels that are used by the 802.11x transceiver and reduce co-channel interference. Bluetooth transmissions, however, may still leak into the 802.11x transceiver, which has a wide band filter to allow operation over the entire allocated 2.4 GHz band. This leakage may cause adjacent channel interference and may still impact the transmit power amplifier. In yet another example, wired co-existence algorithms using 2, 3, or 4 wires may allow the Bluetooth and 802.11x transceivers to inform each other when its radio is active and "suggest" that the other radio back-off its transmission during critical times. The 2, 3, and 4-wire co-existence algorithms use state and priority signals to give granularity for radios to decide when to transmit or not transmit.

In some embodiments, one of these mitigating techniques, or a combination of the mitigating techniques, may be used to mitigate most if not all of the interference problems of simultaneous transmission that may impact the radio power amplifiers. This leaves the last scenario of one transmitter impacting the other receiver, which may be addressed with reference to FIGS. 10-14.

Figure 10:
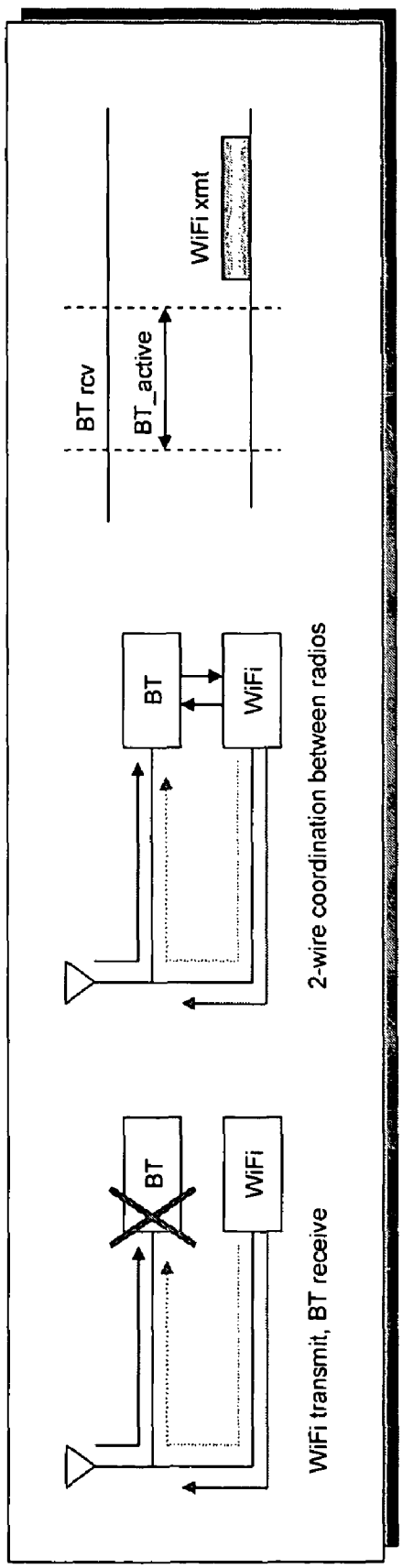
FIG. 10 illustrates one embodiment of a first transmit/receive scenario.

FIG. 10 illustrates one embodiment of a timing diagram for a first transmit/receive scenario. As shown in FIG. 10, assume the Bluetooth transceiver needs to receive at a predictable time-slot and the 802.11x transceiver needs to transmit at approximately the same time as Bluetooth receive operations. If the 802.11x transceiver transmits then the Bluetooth receiver will be overwhelmed by the higher power WiFi signals. This may cause a loss of Bluetooth packets and may potentially cause damage to the Bluetooth receiver front end. Since the Bluetooth receiver follows a predictable time-slot sequence, however, it is possible to use 2, 3, or 4-wire coordination to inform the 802.11x transceiver of precisely when Bluetooth needs a "clear channel." If the 802.11x transceiver obeys this request and delays transmitting during a Bluetooth_active time-slot, then the simultaneous transmit/receive problem may be reduced or mitigated.

Figure 11:
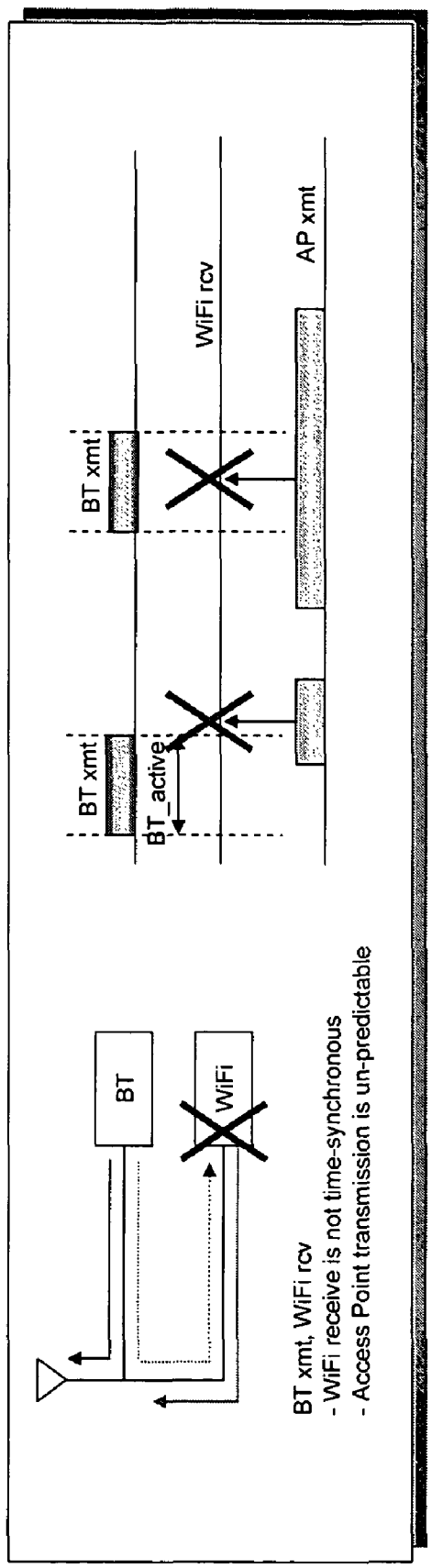
FIG. 11 illustrates one embodiment of a second transmit/receive scenario.

FIG. 11 illustrates one embodiment of a timing diagram for a second transmit/receive scenario. As shown in FIG. 11, assume the 802.11x transceiver needs to receive and the Bluetooth transceiver needs to transmit. The scenario when the Bluetooth transceiver is transmitting and the 802.11x transceiver is receiving is complex for a number of reasons. For example, the nature of 802.11x transceiver access is uncoordinated, so it is possible for a wireless access point (AP) to transmit packets to the handheld at almost any time as limited by power-saving rules and AP beacons. In another example, the WiFi packets are of indeterminate length. In the event that WiFi uses a lower bitrate transmission, then each WiFi packet takes a longer time and therefore may always overlap with a Bluetooth transmission. Potential solutions for these and other problems may be resolved by closely examining two Bluetooth scenarios. The first Bluetooth scenario involves a Bluetooth transceiver using a Synchronous Connection Oriented (SCO) technique when timeslots are reserved for Bluetooth receive every 3.75 msec. The second Bluetooth scenario involves Bluetooth Asynchronous Connectionless (ACL), when the Bluetooth packets are very long (e.g., 3 or 5 timeslots long). Various solutions may be implemented to mitigate interference when the Bluetooth transceiver is transmitting and the 802.11x transceiver is receiving. These solutions may be described in the context of potential use scenarios of the 802.11x transceiver and Bluetooth transceiver using the shared antenna architecture.

The various embodiments may allow a number of different use scenarios for mobile computing device 100. The use scenarios assume substantially simultaneous use of WiFi and Bluetooth, and are designed to enhance user experience. The use scenarios may require certain modifications to one or more coexistence throughputs or throughput constraints used by the multiple transceiver coexistence protocol implemented for transceiver module 304.

A first use scenario may include performing data communications using the 802.11x transceiver while using a peripheral such as a Bluetooth Human Input Device (HID). For example, a user may perform foreground data usage (e.g., check email, browse web) while using a Bluetooth keyboard or mouse. In this scenario, the 802.11x transceiver may have a receive throughput of 15 Mbps (e.g., WinMobile, Linux), and the Bluetooth transceiver may have an ACL receive throughput of 128 kbps. In the first use scenario, the Bluetooth transmit and WiFi receive case does not need to be investigated because it deals only with Bluetooth receive operations with WiFi transmit and receive operations. As discussed earlier, this can be handled using a 2, 3, or 4 wire co-existing algorithm. Furthermore, the Bluetooth receive packets are typically very short. For example, a Bluetooth keyboard does not generate much data, so lost WiFi packets are of a lower concern.

A second use scenario may include performing a voice over Internet Protocol (VoIP), voice over packet (VOP), or VoWLAN call using a peripheral such as a Bluetooth headset. In this scenario, the 802.11x transceiver may have a transmit and/or receive throughput of 64 kbps or 3 packets per second, and the Bluetooth transceiver may have a SCO and/or eSCO throughput of 64 kbps. The timing for the second use scenario may be further described with reference to FIG. 12.

Figure 12:
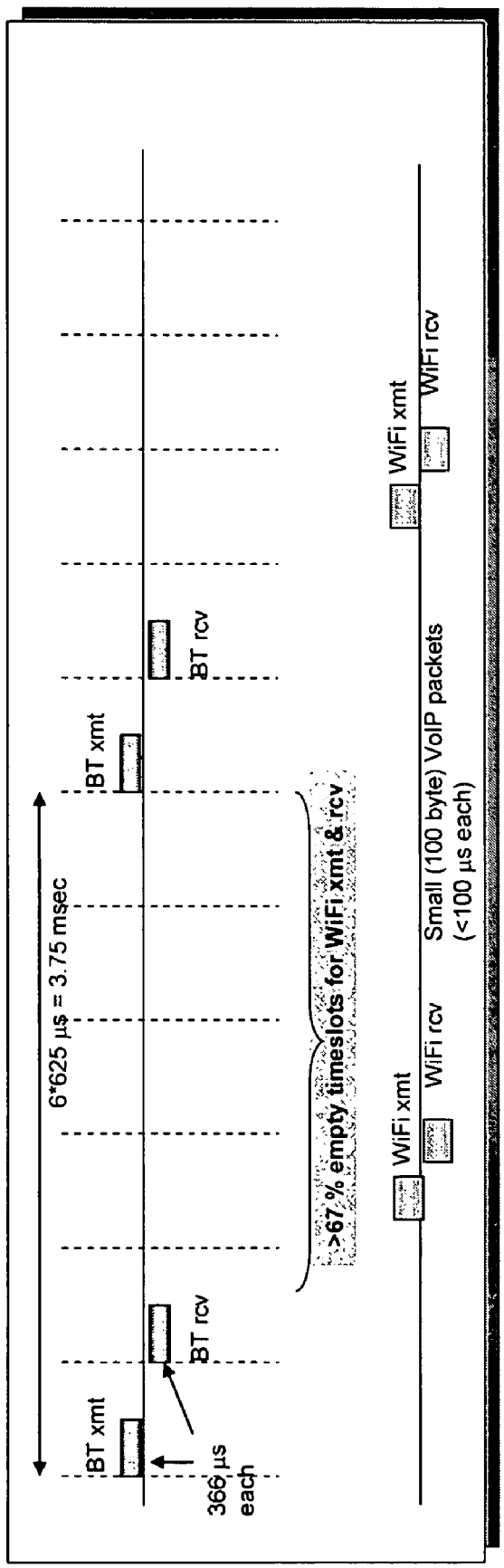
FIG. 12 illustrates one embodiment of a third transmit/receive scenario.

FIG. 12 illustrates one embodiment of a timing diagram for a third transmit/receive scenario. FIG. 12 illustrates a timing diagram for handling a VoIP call using the 802.11x transceiver and a Bluetooth headset. In the second use scenario, voice packets over WiFi are relatively small, such as approximately 100 bytes of payload with header. These smaller packets may need to fit in the "empty" timeslots that are not used for Bluetooth transmit and receive operations. Using a HV3 SCO connection to a Bluetooth headset would use up two out of six Bluetooth timeslots, leaving more than ⅔ of the time free for WiFi transactions. Using a 2-wire co-existence algorithm, the "empty" space for WiFi reception is even wider, estimated at approximately 75%.

A third use scenario may include performing data communications using the 802.11x transceiver while on a cellular telephone call with a Bluetooth headset. For example, mobile computing device 100 may perform a background data synchronization operations (e.g., HotSync, email, web, and so forth) while a user is on a cellular voice call using a Bluetooth headset. In this scenario, the 802.11x transceiver may have a receive throughput of 1.5 Mbps (minimum) with a 3 Mbps target, and the Bluetooth transceiver may have a SCO and/or eSCO throughput of 64 kbps. The third use scenario, however, may introduce some additional complexity for AMM 326 in controlling the timing for transmitting using the Bluetooth transceiver and receiving using the 802.11x transceiver. This added complexity may be described with reference to FIG. 13.

Figure 13:
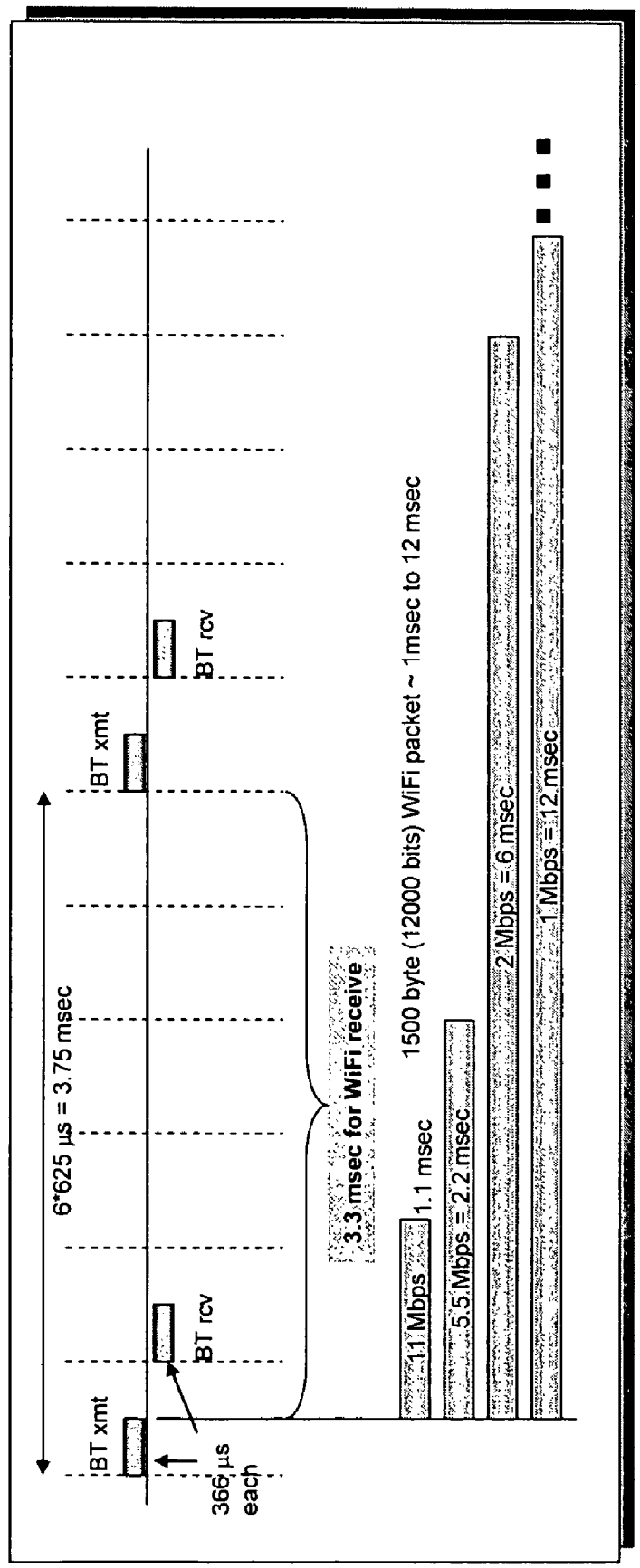
FIG. 13 illustrates one embodiment of a fourth transmit/receive scenario.

FIG. 13 illustrates one embodiment of a timing diagram for a fourth transmit/receive scenario. Assume a user uses mobile computing device 100 for web browsing while on a cellular telephone call. This may create a number of different problems. For example, web browsing applications via the 802.11x transceiver may cause longer packets to be received by the handheld. WiFi packets typically have approximately 1500 bytes. Depending on the WiFi data rate, these frames may take anywhere from 1 msec to 12 msec to receive, as shown in TABLE 11 as follows:

TABLE 11

| WiFi speed | 11 Mbps | 5.5 Mbps | 2 Mbps | 1 Mbps |
|---|---|---|---|---|
| Packet length | 1.1 msec | 2.2 msec | 6 msec | 12 msec |
| Chance of Collision | 39.1% | 68.4% | 100% | 100% |

In another example, when the Bluetooth SCO transceiver is actively transmitting it consumes up to 1 out of 6 time slots, leaving approximately 3.1 to 3.3 msec for WiFi receiving operations. The combination of the Bluetooth SCO radio and long WiFi packets may potentially cause collisions, especially if WiFi speeds decrease due to poor coverage or due to collision. The chance of collision with a Bluetooth SCO for a typical WiFi packet of 1500 bytes (e.g., approximately 12,000 bits) at varying data rates is also shown in Table 11. Once collision occurs, the problem may be exacerbated since standard rate adaptation on the AP may further degrade performance. If the frames from the AP are not received properly due to Bluetooth transmit operations, then the AP may lower the transmission rate. As the bit rate goes down, the packet length gets longer, and the chance for collision increases dramatically. At 2 Mbps, for example, there is little chance that any typical downlink WiFi packet will get through.

In addition, there may be a possibility of collision even for short WiFi beacons sent by the AP to allow stations to go into power save mode. A typical beacon frame of 128 bytes=1024 bits which is approximately 1 msec at a 1 Mbps transmission rate (which is a typical rate used by an AP). As shown in FIG. 13, a 1 msec WiFi beacon packet may still experience an approximate 36% chance of collision, and an approximate 64% chance of successfully getting through.

A fourth use scenario may include streaming media information from the 802.11x transceiver to a peripheral such as a Bluetooth headset. This scenario may be used when watching a movie over a WLAN and listening to the audio over a stereo Bluetooth headset using the A2DP profile. The throughput speeds need to be carefully adjusted in order to maintain a smooth viewing and listening experience. In this scenario, the 802.11x transceiver may have a transmit and/or receive throughput of 768 kbps, and the Bluetooth transceiver may have an ACL transmit throughput of 384 kbps. The fourth use scenario may be described in more detail with reference to FIG. 14.

Figure 14:
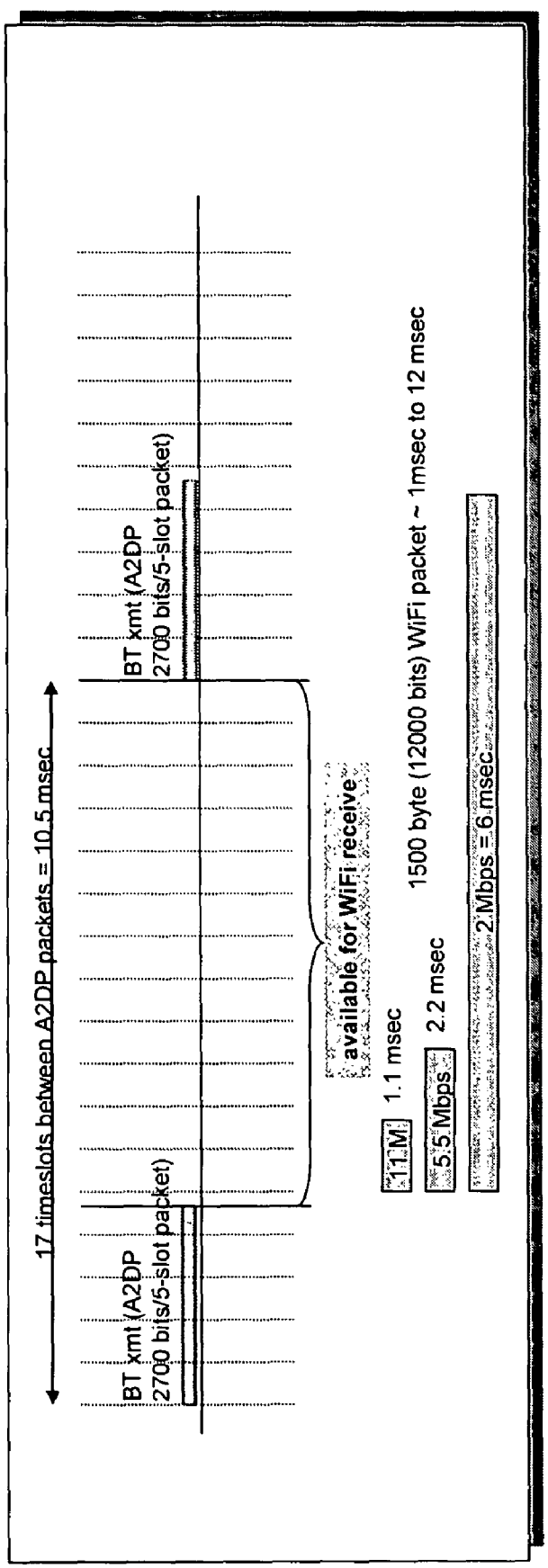
FIG. 14 illustrates one embodiment of a fifth transmit/receive scenario.

FIG. 14 illustrates one embodiment of a timing diagram for a fifth transmit/receive scenario. Assume multi-media streaming via the 802.11x transceiver receives a constant stream of WiFi packets having a typical WiFi packet length (e.g., 1500 bytes or approximately 12,000 bits). This suggests 1.1 to 2.2 msec packets at 11 to 5.5 Mbps. Stereo audio requires more data capacity than mono-voice for cellular telephony. The stereo audio may be delivered, for example, using a subband codec (SBC) via A2DP on an Asynchronous Connection Less (ACL) link. Typically, 256 kbps streaming SBC audio gives reasonable stereo fidelity. Further assume A2DP stereo audio streaming will use multi-slot transmission to efficiently transmit larger blocks of data with longer "empty" slots in between. Bluetooth transmit operations allow for 3-slot or 5-slot transmissions. Using a 5-slot transmission (e.g., approximately 3 msec), the maximum payload is approximately 2700 bits per packet. To deliver 256 kbps, timing requirements may include 95 packets/second (e.g., 256 kbps/2700 bits per 5-slot packet), or about 10.5 msec (e.g., 95 packets/second=10.5 msec per packet) between packets, or about 17 Bluetooth timeslots between packets (e.g., 10.5 msec/packet/625 μsec per Bluetooth timeslot is approximately 17 Bluetooth timeslots between packets).

If WiFi speeds are less than 5.5 Mbps, then there is virtually a 100% chance of collisions between the Bluetooth A2DP packets and WiFi receive packets. At 5.5 Mbps, the 2.2 msec WiFi packets have a 50% chance of collision. At 11 Mbps, the 1.1 msec WiFi packets have a 40% chance of collision. For a typical WiFi packet of 1500 bytes, the chance of collision with a Bluetooth A2DP packet at 256 kbps may be shown in TABLE 12 as follows:

TABLE 12

| WiFi speed | 11 Mbps | 5.5 Mbps | 2 Mbps | 1 Mbps |
|---|---|---|---|---|
| Packet length | 1.1 msec | 2.2 msec | 6 msec | 12 msec |
| Chance of Collision | 39.1% | 49.5% | 100% | 100% |

Various mitigation techniques, however, may be implemented to ensure that WiFi reception is not compromised while Bluetooth audio takes precedence, as detailed below.

In a first mitigation technique, the Bluetooth transceiver may be implemented as a Bluetooth SCO 2.0 EDR transceiver. The higher speed provided by EDR, which can be 2-3 times the raw transmission rate over the air, can enable shorter Bluetooth SCO frames to be used. This may reduce the Bluetooth transmit time from 366 μsec down to 183 μsec, 122 μsec, or less. This may reduce the collision rate to about 30-31% as compared to 40% for a 1 msec WiFi frame. This only applies to a SCO connection with a cellular phone call, however, and not necessarily for streaming audio on A2DP on ACL.

In a second mitigation technique, the 802.11x transceiver may be implemented as an 802.11g radio. Using higher data rates on a WiFi channel may decrease the WiFi packet length significantly. At 54 Mbps, a 1500 byte packet takes about 0.224 msec. This may reduce the collision rate to approximately 16%.

In a third mitigation technique, the 802.11x transceiver may be implemented as an 802.11e radio. The QoS provisions within the 802.11e standards allow a negotiation between the AP and mobile computing device 100 for a shorter frame size. Default frame sizes specify 6 msec for CCK video (e.g., 802.11b), and 3 msec for OFDM video (e.g., 802.11g), for example. Both of these are too long for reliable reception. In addition, mobile computing device 100 can negotiate a shorter frame with the AP. It is worthy to note, however, that some legacy AP may not necessarily support 802.11e.

In a fourth mitigation technique, a lower rate SBC codec may be used for A2DP. When streaming stereo audio to the Bluetooth stereo headphones, it may be possible to choose a lower rate codec so that the required timeslots for Bluetooth transmission is much lower.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
an antenna;
a switch to couple to said antenna;
multiple transceivers to couple to said switch via a power amplifier and a balanced-unbalanced converter, said transceivers to include coexistence interfaces to communicate information in accordance with a multiple transceiver coexistence protocol, said information indicating frequency channels used by at least one of said transceivers to proactively avoid frequency channels used by another transceiver to enable substantially simultaneous operation of the transceivers; and
an antenna management module to couple to said switch and said transceivers, said antenna management module to control said switch to electrically connect one of said transceivers to said antenna.

2. The mobile computing device of claim 1, comprising a filter to couple to said switch, said filter to perform channel filtering for said multiple transceivers.

3. The mobile computing device of claim 1, said transceivers to include an 802.11x transceiver and a Bluetooth transceiver.

4. The mobile computing device of claim 1, said antenna management module to control transmit and receive operations for said multiple transceivers.

5. A mobile computing device, comprising:
an antenna;
a radio sub-system to couple to said antenna, said radio sub-system comprising: a switch to couple to said antenna;
multiple transceivers to couple to said switch via a power amplifier and a balanced-unbalanced converter, said transceivers to include coexistence interfaces to communicate information in accordance with a multiple transceiver coexistence protocol, said information indicating frequency channels used by at least one of said transceivers to proactively avoid frequency channels used by another transceiver to enable substantially simultaneous operation of the transceivers;
an antenna management module to couple to said switch and said transceivers, said antenna management module to control said switch to electrically connect one of said transceivers to said antenna; and a processing sub-system coupled to said radio sub-system, said processing sub-system to include a processor and memory.

6. The mobile computing device of claim 5, comprising a filter to couple to said switch, said filter to perform channel filtering for said multiple transceivers.

7. The mobile computing device of claim 5, said transceivers to include an 802.11x transceiver and a Bluetooth transceiver.

8. The mobile computing device of claim 5, said transceivers to include an 802.11x transceiver, a Bluetooth transceiver, and a cellular radiotelephone system transceiver.

9. The mobile computing device of claim 5, comprising a touch screen display to couple to said processing sub-system, said touch screen display to input a user command to said processing sub-system.

10. A method, comprising:
forming a first connection between a first transceiver and an antenna;
forming a second connection between a second transceiver and said antenna;
forming a third connection between said first transceiver and said second transceiver to communicate coexistence signals between said first transceiver and said second transceiver, the coexistence signals indicating frequency channels used by said first transceiver to cause said second transceiver to proactively avoid frequency channels used by said first transceiver to enable substantially simultaneous operation of the transceivers; and
switching between said first connection and said second connection via a power amplifier and a balanced-unbalanced converter.

11. The method of claim 10, comprising:
determining whether said first transceiver is scheduled to transmit or receive information; and
switching from said second connection to said first connection in accordance with said determination.

12. The method of claim 10, comprising:
determining whether said second transceiver is scheduled to transmit or receive information; and
switching from said first connection to said second connection in accordance with said determination.

13. The method of claim 10, comprising performing channel filtering for said first connection and said second connection.

14. An article comprising a machine-readable storage medium containing instructions that if executed enable a system to form a first connection between a first transceiver and an antenna, form a second connection between a second transceiver and said antenna, form a third connection between said first transceiver and said second transceiver to communicate coexistence signals between said first transceiver and said second transceiver, the coexistence signals indicating frequency channels used by said first transceiver to cause said second transceiver to proactively avoid frequency channels used by said first transceiver to enable substantially simultaneous operation of the transceivers, and switch between said first connection and said second connection via a power amplifier and a balanced-unbalanced converter.

15. The article of claim 14, further comprising instructions that if executed enable the system to determine whether said first transceiver is scheduled to transmit or receive information, and switch from said second connection to said first connection in accordance with said determination.

16. The article of claim 14, further comprising instructions that if executed enable the system to determine whether said second transceiver is scheduled to transmit or receive information, and switch from said first connection to said second connection in accordance with said determination.

17. The article of claim 14, further comprising instructions that if executed enable the system to perform channel filtering for said first connection and said second connection.

* * * * *